(12) United States Patent
Ray et al.

(10) Patent No.: US 8,065,831 B2
(45) Date of Patent: Nov. 29, 2011

(54) STACKABLE STRUCTURAL CELL HAVING IMPROVED SUPPORT CHARACTERISTICS

(75) Inventors: Charles Julian Ray, San Francisco, CA (US); Charles Graham Ray, San Francisco, CA (US); John Joseph Cogger, Santa Ana, CA (US); James Urban, Annapolis, MD (US)

(73) Assignee: DeepRoot Infrastructure, LLC, San Francisco, CA (US)

( * ) Notice: Subject to any disclaimer, the term of this patent is extended or adjusted under 35 U.S.C. 154(b) by 803 days.

(21) Appl. No.: 11/517,970

(22) Filed: Sep. 8, 2006

(65) Prior Publication Data

US 2008/0063935 A1 Mar. 13, 2008

(51) Int. Cl.
*A01G 13/02* (2006.01)
(52) U.S. Cl. ........................................................ 47/32.7
(58) Field of Classification Search .................. 47/32.7, 47/1.01 F, 1.01 T, 32, 32.8; 405/272; D25/126
See application file for complete search history.

(56) References Cited

U.S. PATENT DOCUMENTS

| | | | | |
|---|---|---|---|---|
| D273,334 S | * | 4/1984 | Young | D25/126 |
| 4,983,069 A | * | 1/1991 | Florence | 405/43 |
| D346,036 S | * | 4/1994 | Garber | D25/126 |
| 5,379,566 A | * | 1/1995 | Schworer | 52/632 |
| 5,704,159 A | * | 1/1998 | Dreyer et al. | 47/32.7 |
| D393,966 S | * | 5/1998 | Grosfillex | D6/495 |
| D415,847 S | * | 10/1999 | Schaefer | D25/126 |
| 6,779,946 B1 | * | 8/2004 | Urriola et al. | 405/43 |
| 7,591,610 B2 | * | 9/2009 | Krichten et al. | 405/50 |
| 2003/0082359 A1 | * | 5/2003 | Scott | 428/221 |
| 2005/0155285 A1 | * | 7/2005 | Urban et al. | 47/32.7 |

* cited by examiner

*Primary Examiner* — Timothy D Collins
*Assistant Examiner* — Monica Williams
(74) *Attorney, Agent, or Firm* — Innovation Counsel LLP (57) ABSTRACT

Structural cells that are placed beneath hardscape. The cells are strong enough to structurally support the hardscape, effectively bearing its weight along with the weight of any load it carries. Furthermore, even though the cells are strong enough to offer structural support of a hardscape, the cells are also designed to be relatively lightweight, stackable, and open, allowing approximately 90% of their volume, or more, to be free volume that can contain uncompacted soil, tree roots, and the like. The cells achieve these attributes through a design that includes a flexible bottom frame, and support members. These support members have a cross-sectional shape that allows for axial rigidity while also preventing any interlocking between support members when cells are stacked. In one embodiment, this cross-sectional shape is a generally quadrifoil shape.

16 Claims, 10 Drawing Sheets

DETAIL C

FIG. 4E

DETAIL A

FIG. 4A

DETAIL B

FIG. 9E DETAIL C

FIG. 9D SECTION B-B

FIG. 9C SECTION A-A

STACKABLE STRUCTURAL CELL HAVING IMPROVED SUPPORT CHARACTERISTICS

BRIEF DESCRIPTION OF THE INVENTION

This invention relates generally to structural support devices. More specifically, this invention relates to stackable structural cells for supporting hardscape and allowing tree root growth underneath the hardscape.

BACKGROUND OF THE INVENTION

The design of many modern dense urban landscapes often calls for the placement of trees within paved-over areas or areas covered by other hardscapes. In particular, such designs often call for trees to be placed in close proximity to roads, sidewalks, and other load bearing pathways. However, the weight of these pathways and the loads they carry often compact the soil underneath to such an extent that it is often difficult for tree roots to sufficiently penetrate the soil. As a result, trees planted in close proximity to these hardscapes may not survive or grow to the full extent envisioned.

Various solutions to this problem have been proposed. For example, structural cell systems such as those disclosed in U.S. Pat. No. 7,080,480, which is hereby incorporated by reference in its entirety and for all purposes, have been designed to facilitate the growth of trees near hardscapes, while allowing for soil aeration, water drainage, and the like. It is, however, desirable to improve various aspects of such cells. Accordingly, continuing efforts exist to make such structural cells support hardscapes better, while improving the manufacturability and other characteristics of such cells.

SUMMARY OF THE INVENTION

The invention can be implemented in numerous ways. Accordingly, various embodiments of the invention are discussed below.

In one embodiment, a structural cell for supporting hardscape and allowing tree root growth underneath the hardscape comprises a cell structure having a bottom portion and a plurality of support members. The cell structure has a vertical direction generally perpendicular to the bottom portion and lateral directions generally within the bottom portion. Outer edges of the bottom portion and the plurality of support members define a volume, where the cell structure is configured to support the hardscape while allowing generally unimpeded growth of tree roots through at least approximately ninety percent of the volume. Also, the cell structure is stackable upon another one of the cell structure so that the support members of the stacked cell structures provide the support of the hardscape, and so that the stacked cell structures are substantially coupled in their vertical directions and substantially uncoupled in their lateral directions.

In another embodiment, a structural cell for supporting hardscape and allowing generally unimpeded tree root growth underneath the hardscape comprises a base having a first side and a second side, and a plurality of support members extending from the base. Each support member of the plurality of support members has a cross-sectional shape that is a generally quadrifoil shape, the plurality of support members configured to provide structural support of the hardscape. Ones of the support members extending from the first side of the base have a first orientation of their generally quadrifoil shapes, and ones of the support members extending from the second side of the base have a second orientation of their generally quadrifoil shapes.

In yet another embodiment, a deck for a structural cell, the structural cell allowing tree root growth underneath a hardscape and having a plurality of support members configured to structurally support the hardscape, comprises a rigid body having recesses located so as to contact the support members when the body is seated upon the structural cell. The rigid body is configured to prevent compaction of soil within the structural cell when the body is seated upon the structural cell, so as to facilitate the growth of the tree roots underneath the seated body and within the structural cell.

Other aspects and advantages of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS OF THE INVENTION

In one aspect, the invention relates to structural cells that are placed beneath hardscape. The cells are strong enough to structurally support the hardscape, effectively bearing its weight along with the weight of any load it carries. Furthermore, even though the cells are strong enough to offer structural support of a hardscape, the cells are also designed to be relatively lightweight, stackable, and open, allowing approximately 90% of their volume, or more, to be free volume that can contain uncompacted soil, tree roots, utilities, and the like. The cells achieve these attributes through a design that includes a flexible bottom frame, and support members. These support members have a cross-sectional shape that allows for axial rigidity while also preventing any interlocking between support members when cells are stacked. In one embodiment, this cross-sectional shape is a generally quadrifoil shape. In addition, each cell includes support members whose quadrifoil shapes are oriented 45 degrees apart from each other, so that the support members do not interlock when these cells are stacked.

Figure 1:
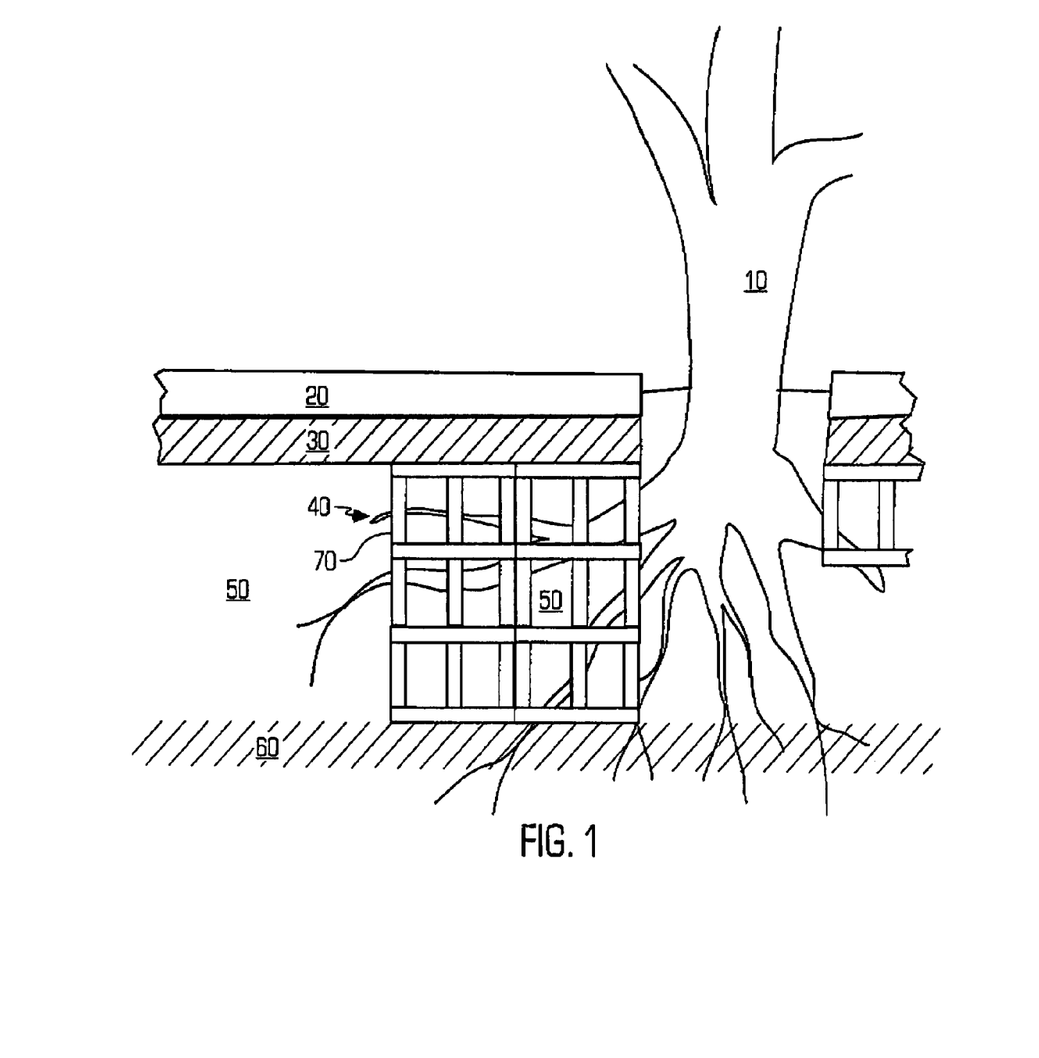
FIG. 1 illustrates an exemplary structural cell system of the invention.

FIG. 1 illustrates an exemplary application of the structural cells of the invention. Here, a tree 10 grows its roots in the soil 50 underneath a hardscape 20 and layer of aggregate 30. Because the tree 10 requires relatively uncompacted soil for proper water drainage and root growth, three layers of structural cells 40 are stacked between the hardscape 20 and aggregate 30 above, and foundation 60 below. The cells 40 are sufficiently rigid that they structurally support the weight of the hardscape 20, aggregate 30, and any loads above (e.g., cars, pedestrians, etc.), transferring it to the foundation 60 rather than the soil 50. This maintains the soil 50 within the structural cells 40 in a relatively uncompacted state, allowing roots from the tree 10 to grow therethrough as shown. In addition, the rigidity of the cells 40 allows a relatively small number of support members to bear structural loads. In this manner, the cells 40 maintain a large amount of continuous open volume within, free of excessive numbers of support members that take up space and prevent large tree roots from growing therethrough.

In some embodiments, the structural cells 40 are configured to satisfy a number of constraints. For example, the cells 40 should be composed of a material capable of withstanding an underground environment that can contain water. This material should also be of sufficient strength to support a hardscape 20, aggregate 30, and their associated loads. In some embodiments, it is preferable for the cells 40 to support loads in accordance with known AASHTO (American Association of State Highway and Transportation Officials) H20 load requirements. In addition, the cells 40 are to be configured to be stackable upon each other, as shown in FIG. 1, without interlocking. That is, when cells 40 are stacked upon each other, the stacked support members 70 should not interlock, as compressive forces could cause the lower support members 70 to telescope excessively into the upper support members 70 that are stacked upon them, allowing the stacked cells 40, and thus the overlying hardscape 20, to sink. Finally, the cells 40 should preferably be designed to be injection-moldable.

Figure 2:
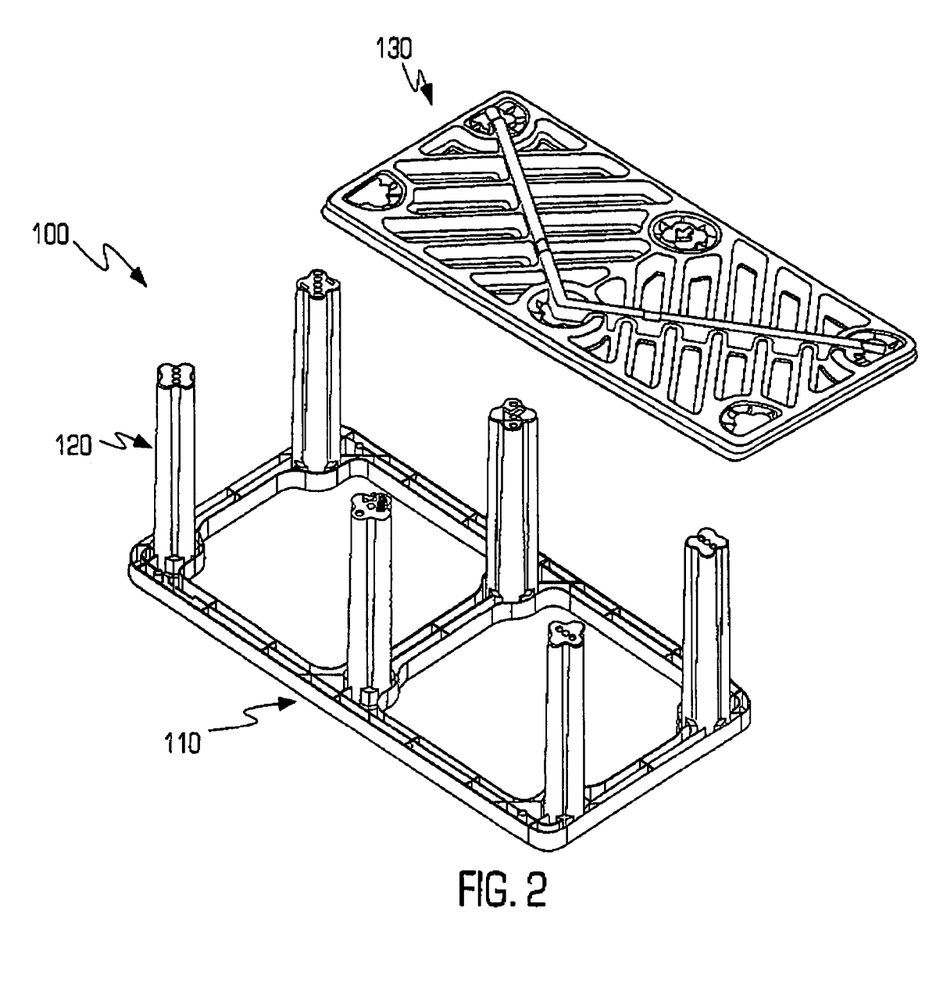
FIG. 2 illustrates an isometric detail view of a structural cell of the invention, including a frame portion and a deck portion.

These constraints are satisfied by the structural cell design of FIG. 2, which illustrates further details of the structural cells 40 of FIG. 1. In FIG. 2, the structural cell has a frame portion 100 that has a lower frame 110, or bottom portion. A number of support members 120 protrude from the lower frame 110. As will be discussed further below, the support members 120 can be integrally formed with the lower frame 110 and can also be designed to be detachable. The invention includes both configurations. A deck 130, or upper portion, is placeable upon the support members 120 as shown. When cells 40 are stacked, such as in FIG. 1, the deck 130 is typically placed upon the uppermost cells 40, directly beneath the layer of aggregate 30.

Figure 3:
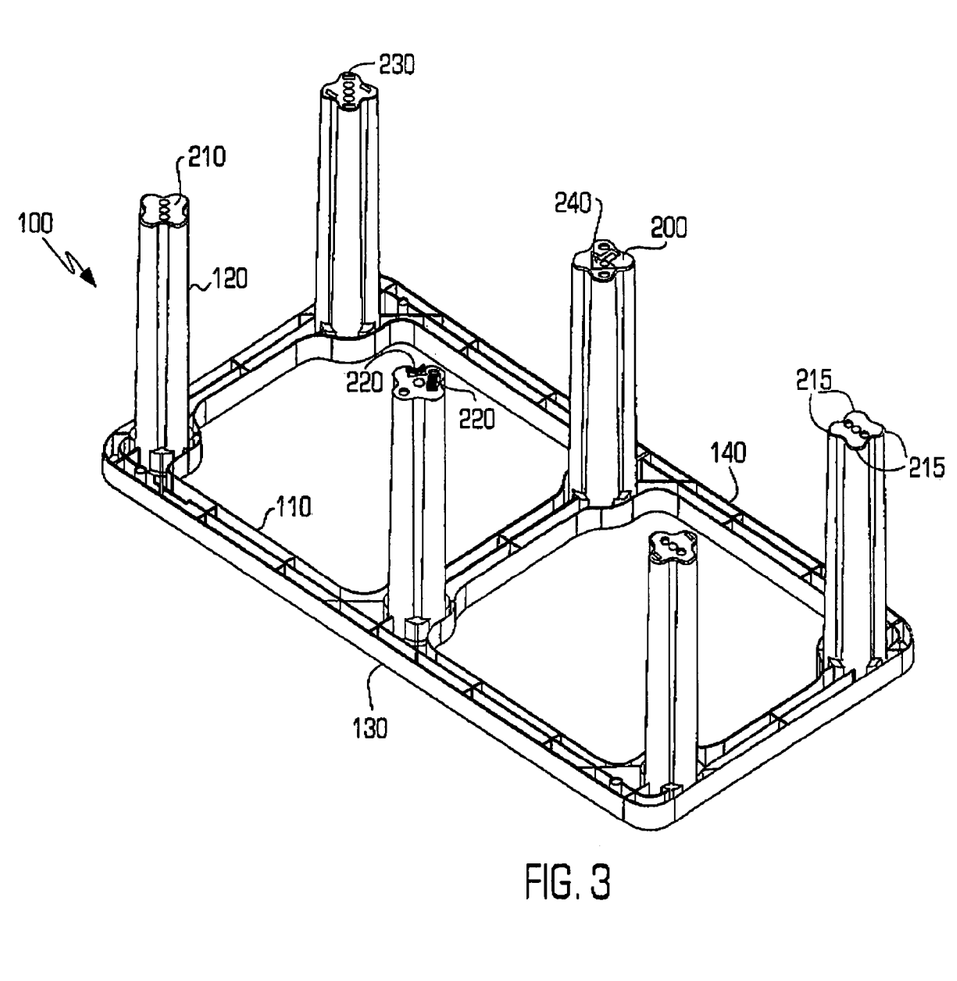
FIG. 3 is an isometric view illustrating further details of the frame portion of FIG. 2.

Attention now turns to a more detailed discussion of the cell 100. FIG. 3 is an isometric view illustrating further details of the frame portion 100 of FIG. 2. In the embodiment shown, the lower frame 110 is generally rectangular, with three support members 120 along each of its longer sides 130, 140. The lower frame 110 is also relatively thin and therefore pliable, so as to conform to irregularities in the foundation 60. It can be observed that the cell 100 leaves the volume within largely unobstructed, i.e., free of excessive numbers of support members, allowing large roots and other large-sized objects to be placed within. This yields significant advantages, as cells 100 not only contain relatively large amounts of open space, but this open space is easily accessible for penetration by roots or other objects. Thus, not only is space available for roots and other objects, but they can grow into, or be placed within, the cells in a relatively unimpeded fashion. Cells 100 can thus be used in connection with even very large trees, with large root systems, as the cells 100 offer very little in the way of obstructions to impede the growth of even large roots therethrough. These cells 100 can also be easily filled with soil, in contrast to cells with excessive numbers of support members that inhibit the placement of soil or other objects within.

The support members 120 have top surfaces 200, 210 that have a shape generally referred to as a quadrifoil or four-leaved shape, having four distinct, rounded "lobes" 215. It can be seen that the support members 120 along side 130 of the lower frame 110 have lobes 215 oriented at 45° from the lobes 215 of the support members 120 along side 140. That is, the lobes 215 along side 130 are rotated 45° relative to the lobes 215 along the opposite side 140. In this manner, one of ordinary skill in the art will observe that two cells 100, when stacked so that side 140 of the upper cell 100 is aligned above side 130 of the lower cell 100 (i.e., the upper cell is rotated 180° relative to the lower cell), the support members 120 of the upper cell will have their top surfaces 200 rotated 45° relative to the top surfaces 210 of the lower support members 120. That is, the upper support members 120 will rest upon the lower support members 120 upon which they are stacked, but the quadrifoil shapes of the upper support members 120 will be rotated 45° relative to the quadrifoil shapes of the lower support members 120. This relative rotation prevents the stacked support members 120 from interlocking, or "smashing together," thus reducing their overall height and leading to sagging of the overlying hardscape 20. The rounded lobes 215 also do not have any sharp edges or corners, preventing significant stress concentrations.

In addition to their orientations, the support members 120 include other beneficial features. For instance, supports 220 connect to axial members embedded within the deck 130 (to be discussed further below), allowing the deck 130 to assist in preventing deformation of the support members 120. Features such as slots 230 act as locating features, allowing for cells 100 to support snap-fit connections that secure stacked cells in place. In this manner, hooks can be fabricated on the undersides of the support members 120, corresponding to the slots 230. For example, four slots 230 are shown on the uppermost support member 120 of FIG. 3, and two slots 230 are shown on the lowermost support member 120. In order to ensure that cells 100 can only be stacked upon each other in 180° opposite directions, the lowermost support member 120 can have four hooks (not shown) fabricated so as to protrude from its underside, and snap into the four slots 230 of the uppermost support member 120. Similarly, the uppermost support member 120 can have two hooks (not shown) configured to snap into the two slots 230 of the lowermost support member 120. This ensures that stacked cells 100 must be rotated 180° relative to each other if they are to properly snap together.

Another feature shown in FIG. 3 is a visual indicator 240 (shown here as an arrow) that further highlights the desired orientation of the cells 100. In the case of the arrow shown, if alternating layers of cells 100 are to be rotated 180° relative to each other, it can be seen that successive layers should have arrows pointing in opposite directions. The visual indicator 240 thus provides a quick and convenient way to determine whether cells 100 have been stacked properly upon each other.

It should be noted that, while a generally quadrifoil shape such as the one shown is often preferable, the invention is not limited to this shape. Rather, the invention encompasses any cross-sectional shape of the support member 120 that allows cells 100 to be stackable upon each other without significant reduction in the overall height of the stacked cells 100. It follows that the invention also encompasses cells 100 whose support members are rotated at other amounts besides 45°, or indeed need not be rotated at all. It also follows that the invention encompasses cells 100 that can be stacked in other orientations besides 180°-opposing layers.

Figure 4A:
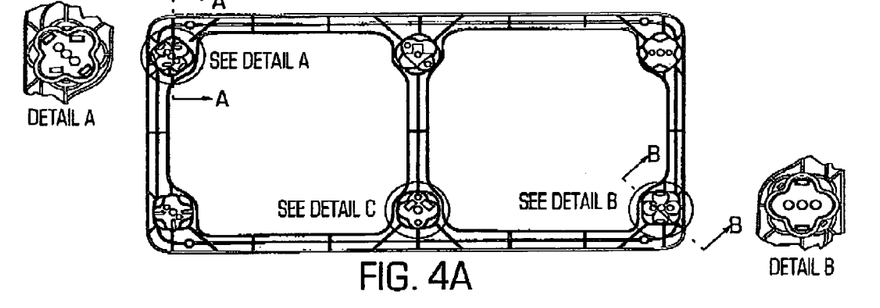
FIGS. 4A-4E are various views of the frame portion of FIGS. 2-3, illustrating further details of various features in accordance with the invention.
Figure 4B:
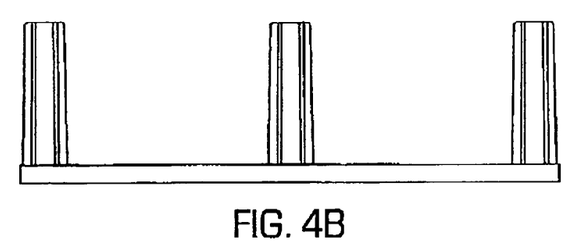
Figure 4C:
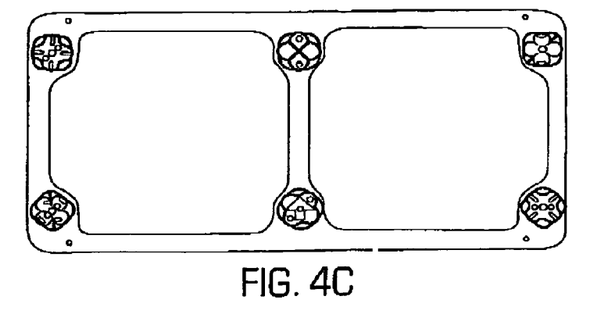
Figure 4D:
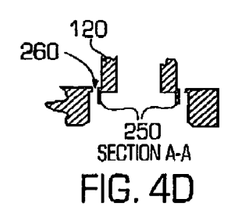
Figure 4E:
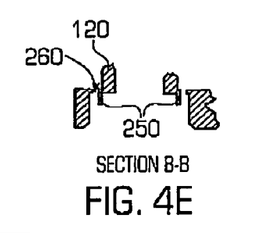
Figures 5A, 5B:
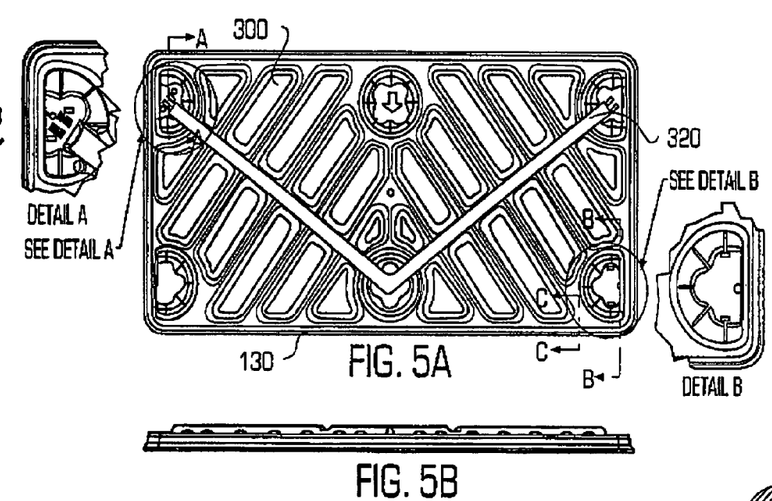
FIGS. 5A-5F are various views of the deck portion of FIGS. 2-3, illustrating further details of various features in accordance with the invention.
Figure 5C:
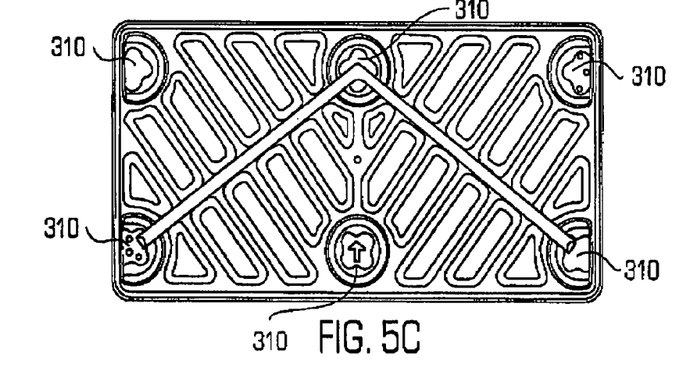
Figure 5D:
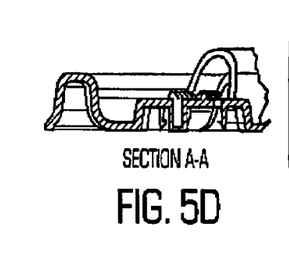
Figure 5E:
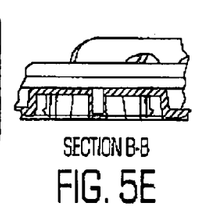
Figure 5F:
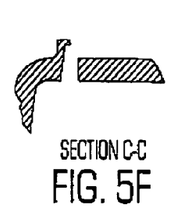
Figure 6:
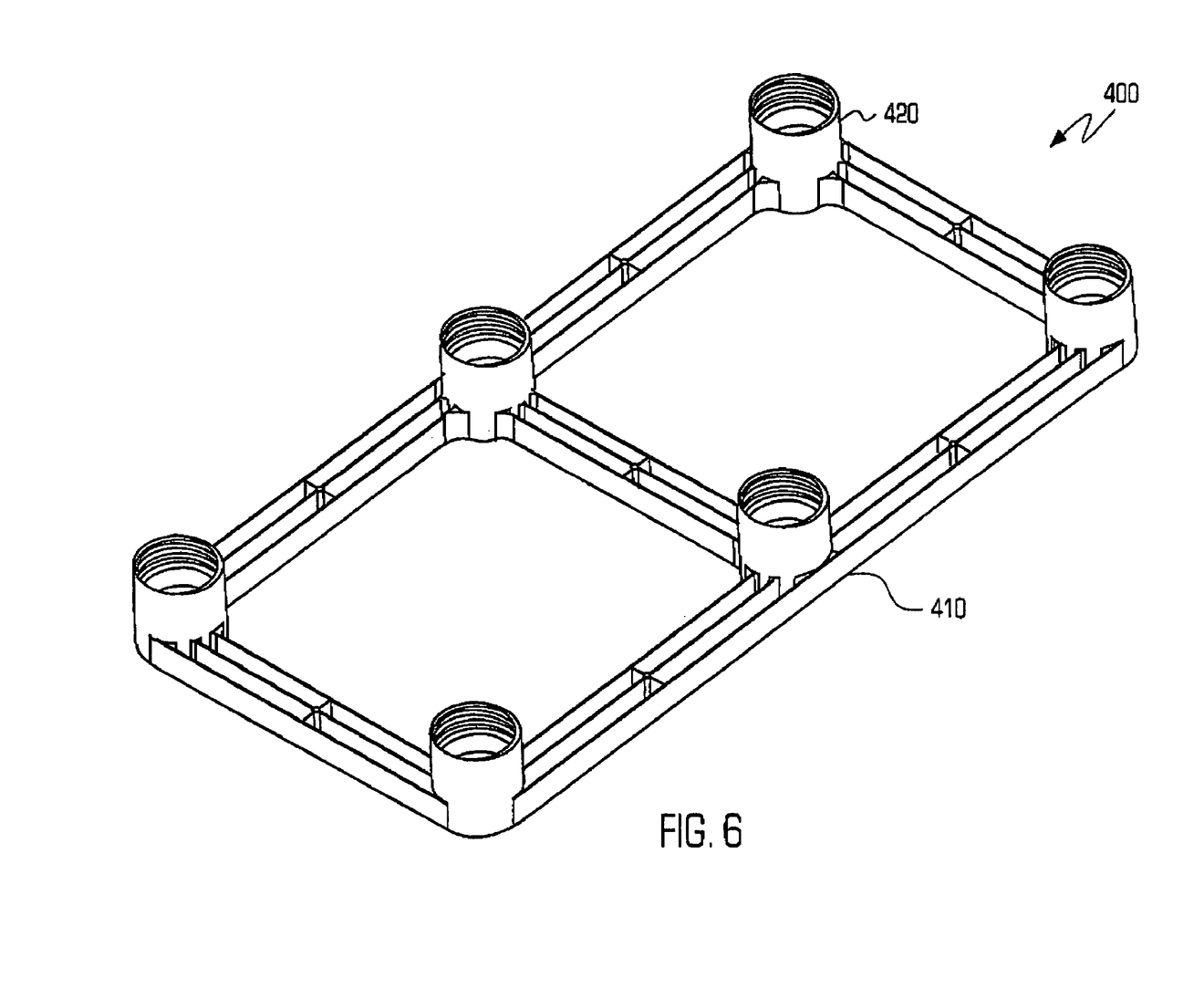
FIG. 6 illustrates an isometric detail view of a structural cell of the invention, including a frame portion having detachable support members.
Figures 7A, 7B:
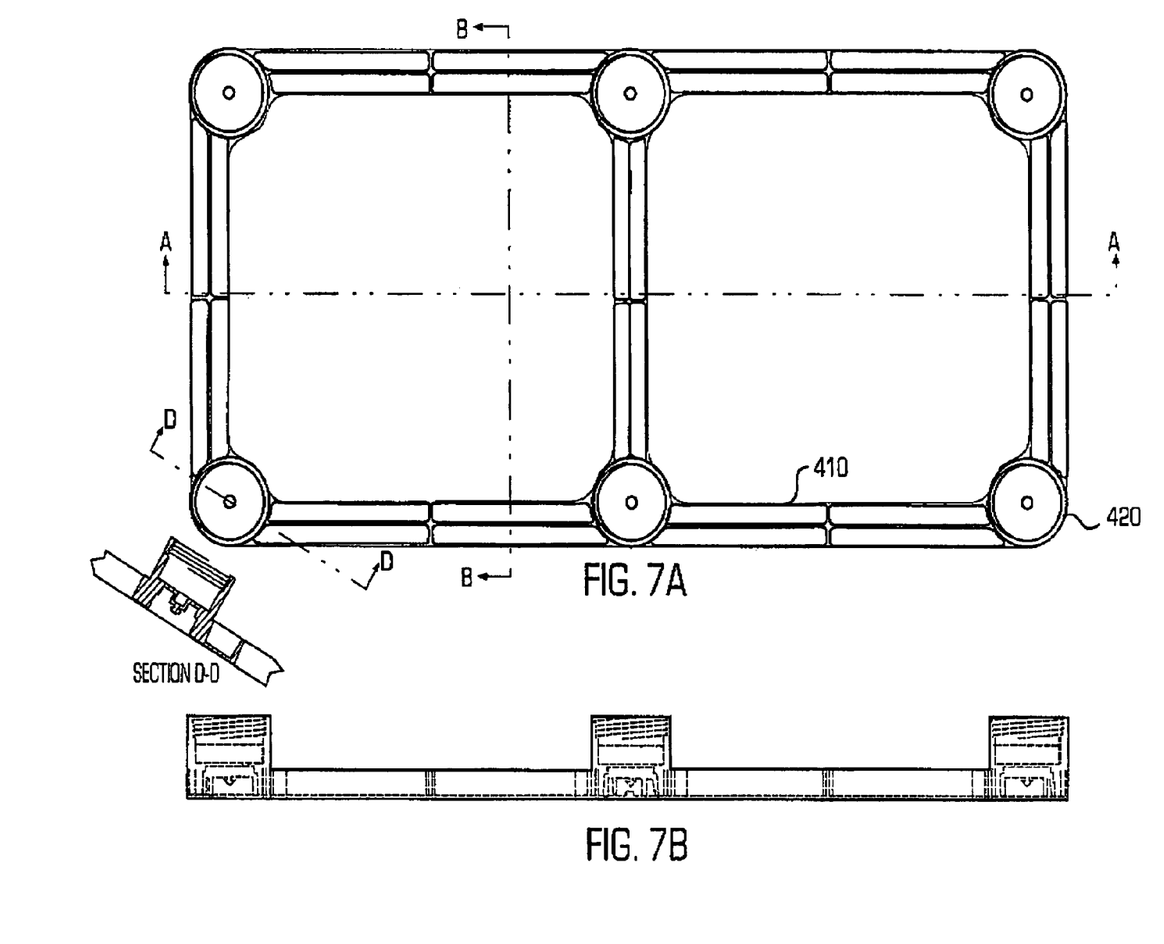
FIGS. 7A-7G illustrate various views of the frame portion of FIG. 6, and further details thereof.
Figures 7C, 7D, 7E, 7F, 7G:
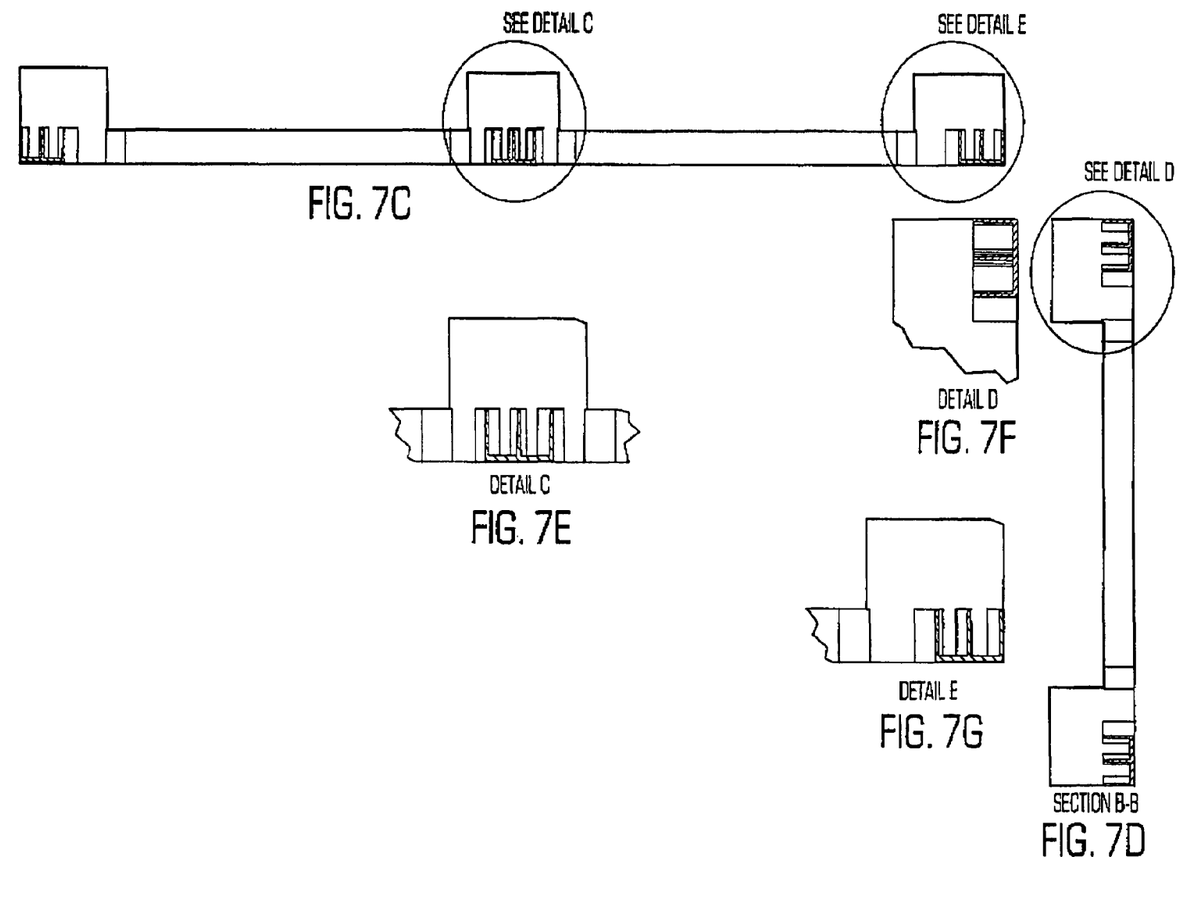
Figure 8A:
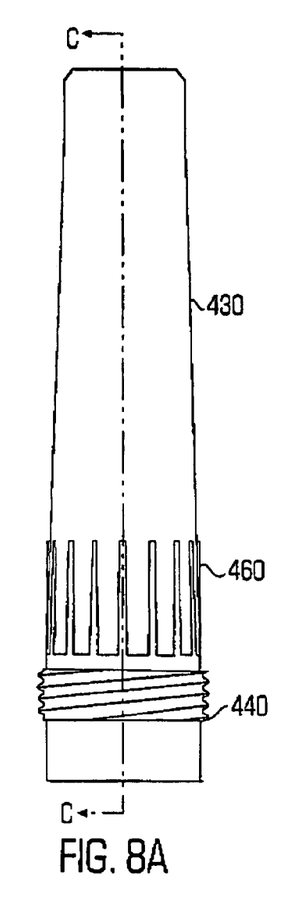
FIGS. 8A-8B illustrate a side view and a cross-sectional side view, respectively, of detachable support members for use with the frame portion of FIG. 6.
Figure 8B:
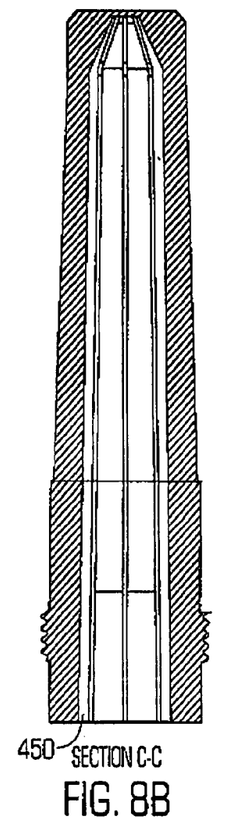
Figures 9A, 9B:
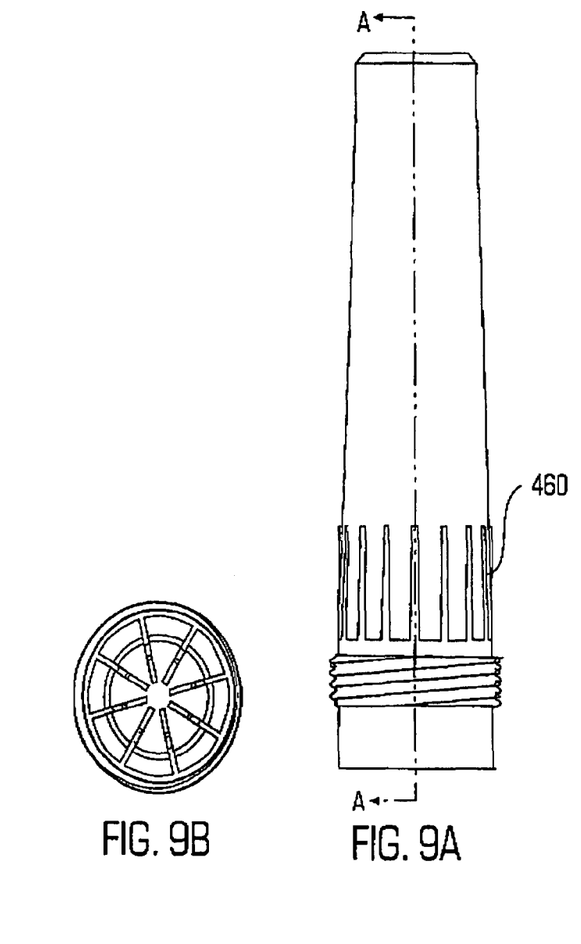
FIGS. 9A-9E illustrate various views of the detachable support members of FIGS. 8A-8B, and further details thereof.
Figure 9C:
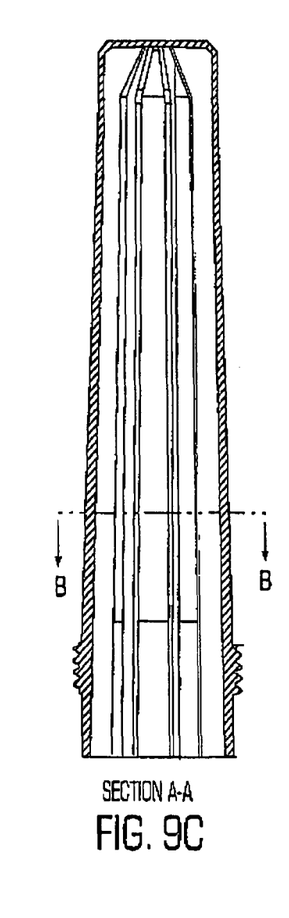
Figure 9D:
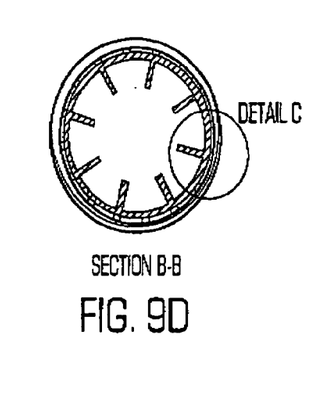
Figure 9E:
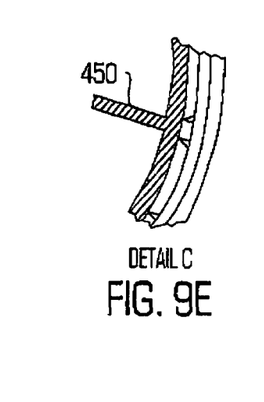

FIGS. 4A-4E are various views of the frame portion of FIGS. 2-3, illustrating further details of the cells 100. In particular, FIGS. 4D-4E illustrate cross-sectional views of two of the support members 120, further describing their snap-fit connections. Hooks 250 protrude from the undersides of the support members 120, where they can snap into corresponding slots 230, securing the cells 100 when stacked. These connections can also include holes 260 for prying the hooks 250 out of their slots 230, thus rendering the connections removable and allowing cells 100 to be unstacked, or disassembled, if desired. It should be observed that, while the snap-fit connections can connect stacked cells together, they are of insufficient size and strength to offer significant structural support. That is, even though the support members 120 of stacked cells 100 rest atop each other and are thus substantially coupled with respect to vertical forces, these same cells 100 remain substantially uncoupled laterally (i.e., directions within the plane of the lower frame 110). In operation, sufficient lateral stability is typically offered by the surrounding soil 50 and frictional forces from the aggregate 30 and foundation 60, rather than by the snap-fit connections. It can be seen that the lateral decoupling of stacked cells 100 allows these cells 100 to more effectively transfer their structural loads down to the foundation 60.

Details of the cell 100 having been explained, attention now turns to a more detailed explanation of the deck 130. FIGS. 5A-5F are various views of the deck 130, illustrating further details of various features in accordance with the invention. As explained previously, the deck 130 sits atop the uppermost layer of cells 100, preventing overlying material from pressing into the cells 100 and excessively compacting the soil 50 within. In one embodiment, the deck 130 includes recesses 310 that correspond to the support members 120. The recesses 310 are positioned so as to seat upon the support members 120 when the deck 130 is placed atop a cell 100. In known fashion, the recesses 310 and/or support members 120 can include a number of attachment devices, such as the snap-fit mechanisms described above, to more securely fasten the deck 130 atop the cell 100. The deck 130 also includes a number of depressions 300 and channels 320. The channels 320 are each configured to hold an axial resistance member (not shown), which is fastened upon the supports 220 and between the top surfaces 200 of two (or, in other embodiments, more) support members 120 in order to prevent deformation of the support members 120 along the axial resistance member. The axial members thus help prevent phenomena such as creep, or time-dependent deformation, of the support members 120. The axial members can be made of any material that is both compatible with the material(s) of the cell 100, deck 130 and the underground environment in which they are placed, and capable of sufficiently preventing deformation of the support members 120. For example, the axial members can be fabricated as a galvanized steel tube.

In operation, a geotextile layer is typically placed upon the deck 130, and the aggregate 30 and hardscape 20 are poured upon the geotextile layer. The weight of the aggregate 30 and hardscape 20 then acts to push the geotextile layer partially into the depressions 300. This acts to secure the deck 130 and cells 100 against any lateral movement, adding to the structural stability of the cells 100. Stability is further aided by the soil 50, which also supports the cells 100 against any lateral movement.

It should be noted that the invention encompasses cells 100 and lids 130 that are fabricated from any material(s) that satisfy the constraints listed above, i.e., that are sufficiently strong, yet can tolerate an underground environment and can be injection molded. For example, it is often preferable to fabricate the cells 100 and deck 130 of polypropylene that is at least 30% glass-filled. One of ordinary skill in the art will realize that the use of 30% glass-filled polypropylene allows for the design of cells 100 that can withstand H20 loading while maintaining 90% of its volume open for tree root growth within, as shown.

As described above, the support members 120 can be integrally formed with the lower frame 110, and can also be detachable from the lower frame 110. FIGS. 6 and 7A-7G illustrate the latter concept. Here, the lower frame 400 has a body 410 having receptacles 420 designed to support detachable support members. The invention encompasses any method of attaching/detaching such support members, although for ease of illustration the receptacles 420 are shown here as being threaded. The corresponding support members are illustrated in FIGS. 8A-8B and 9A-9E. Here, the support members 430 include threads 440 for screw-type attachment to the receptacles 420, and a grip area 460 for easy gripping during attachment/detachment. Ribs 450 can be added to increase the strength of the support members 430, if desired. The detachable support members 430 confer certain advantages, such as space savings during shipping. Also, the number of threads 440 can be chosen for sufficient strength in attachment, while requiring a minimal number of turns so as to minimize assembly time/effort. As can be seen from FIGS. 8A-8B, this number can be chosen as approximately four turns, although the invention certainly contemplates any other number.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, the support members 130 can be of any non-interlocking design, even though a generally quadrifoil shape is often desirable. Similarly, the support members can be designed to be detachable, or integral with the lower frame 110. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A structural cell for supporting hardscape and allowing tree root growth underneath the hardscape, comprising:
  a cell structure having a bottom portion and a plurality of support members, the cell structure having a vertical direction generally perpendicular to the bottom portion and lateral directions generally within the bottom portion;
  wherein outer edges of the bottom portion and the plurality of support members define a volume, the cell structure configured to support the hardscape while allowing generally unimpeded growth of tree roots through at least approximately ninety percent of the volume;

wherein the cell structure is stackable upon another one of the cell structure so that the support members of the stacked cell structures provide the support of the hardscape, and so that the stacked cell structures are substantially coupled in their vertical directions and substantially uncoupled in their lateral directions;

wherein the cell structure is capable of being oriented in orientations about its vertical direction, and wherein the cell structure is configured to be stacked upon another one of the cell structures in a generally opposite orientation from the orientation of the another one of the cell structures;

wherein each support member of the plurality of support members has a cross-sectional shape that is a generally quadrifoil shape configured to prevent interlocking of the generally oppositely oriented stacked cell structures; and wherein the plurality of support members further includes a first set of support members having a first support member orientation, and a second set of support members having a second support member orientation that is rotated approximately 45 degrees from the first support member orientation.

2. The structural cell of claim 1 wherein the cell structure is configured to support the hardscape according to H20 loading requirements.

3. The structural cell of claim 1 wherein each support member of the plurality of support members is formed integrally with the bottom portion.

4. The structural cell of claim 1 wherein each support member of the plurality of support members is configured to be removably affixed to the bottom portion.

5. The structural cell of claim 1 further comprising an upper portion configured for attachment to the support members generally opposite to the bottom portion.

6. The structural cell of claim 5 wherein the upper portion further comprises at least one resistance member configured to be coupled between at least two of the support members, the resistance member further configured to reduce a deformation of the at least two support members in at least one of the lateral directions.

7. The structural cell of claim 1 wherein the cell structure is a polypropylene resin that is at least 30% glass-filled.

8. The structural cell of claim 1 wherein the cell structure is further configured to support the hardscape while allowing placement of utilities within at least approximately ninety percent of its volume.

9. A structural cell for supporting hardscape and allowing generally unimpeded tree root growth underneath the hardscape, comprising:

a base having a first side and a second side; and a plurality of support members extending from the base, each support member of the plurality of support members having a cross-sectional shape that is a generally quadrifoil shape, the plurality of support members configured to provide structural support of the hardscape;

wherein ones of the support members extending from the first side of the base have a first orientation of their generally quadrifoil shapes, and ones of the support members extending from the second side of the base have a second orientation of their generally quadrifoil shapes; and wherein the first and second orientations are further configured to prevent interlocking of the structural cell with another one of the structural cell when the structural cell is stacked upon the another one of the structural cell; and wherein the second orientation is rotated approximately 45 decrees relative to the first orientation.

10. The structural cell of claim 9 wherein:

the base and the plurality of support members collectively occupy a first volume;

the base and the plurality of support members collectively outline a second volume; and a ratio of the second volume to the first volume is at least approximately 9:1, so as to facilitate generally unimpeded growth of the tree roots and placement of utilities within the second volume.

11. The structural cell of claim 9 wherein the plurality of support members is configured to support the hardscape according to H20 loading requirements.

12. The structural cell of claim 9 wherein each support member of the plurality of support members is formed integrally with the base.

13. The structural cell of claim 9 wherein each support member of the plurality of support members is configured to be removably affixed to the base.

14. The structural cell of claim 9 further comprising a deck configured for attachment to the plurality of support members generally opposite to the base.

15. The structural cell of claim 14 wherein the deck further comprises at least one resistance member configured to be coupled between at least two of the support members, the resistance member further configured to reduce a deformation of the at least two support members along the resistance member.

16. The structural cell of claim 9 wherein the base and the plurality of support members are comprised of a polypropylene resin that is at least 30% glass-filled.

* * * * *